(12) United States Patent
Motush et al.

(10) Patent No.: US 6,978,636 B2
(45) Date of Patent: Dec. 27, 2005

(54) DEVICE FOR MEASURING PRESSURE IN AUTOMOBILE AIR CONDITIONER AND CHARGING SAME WITH REFRIGERANT AND METHOD OF SAME

(75) Inventors: Ken Motush, Tarrytown, NY (US); Thomas Gottlieb, Scotch Plains, NJ (US); Vincent Carrubba, Baldwin, NY (US)

(73) Assignee: Interdynamics, Inc., Tarrytown, NY (US)

( * ) Notice: Subject to any disclaimer, the term of this patent is extended or adjusted under 35 U.S.C. 154(b) by 0 days.

(21) Appl. No.: 10/664,507

(22) Filed: Sep. 16, 2003

(65) Prior Publication Data

US 2005/0056040 A1    Mar. 17, 2005

(51) Int. Cl.[7] .................. F25B 45/00; G05D 7/00; F17D 3/00; A01G 25/09
(52) U.S. Cl. .................. 62/292; 62/77; 62/149; 137/107; 137/557; 137/899
(58) Field of Search .................. 62/292, 77, 149; 137/107, 557, 899

(56) References Cited

U.S. PATENT DOCUMENTS

| | | | |
|---|---|---|---|
| 2,320,042 A | 5/1943 | McMahan | |
| 3,052,101 A | 9/1962 | Bishop | |
| 3,996,765 A | 12/1976 | Mullins | |
| 4,338,793 A | 7/1982 | O'Hern, Jr. | |
| 4,856,288 A * | 8/1989 | Weber | 62/129 |
| 4,958,501 A | 9/1990 | Nakano | |
| 5,158,747 A | 10/1992 | Manz | |
| 5,336,065 A * | 8/1994 | Tieken | 417/437 |
| 5,358,009 A * | 10/1994 | Cambell | 137/899 |
| 5,439,022 A * | 8/1995 | Summers et al. | 137/102 |
| 5,557,940 A * | 9/1996 | Hendricks | 62/149 |
| 5,846,833 A | 12/1998 | Clough | |
| 6,089,032 A | 7/2000 | Trachtenberg | |
| 6,209,562 B1 * | 4/2001 | Shaw | 137/15.18 |
| 6,260,739 B1 | 7/2001 | Hsiao | |
| 6,385,986 B1 * | 5/2002 | Ferris et al. | 62/292 |
| 6,446,453 B1 | 9/2002 | Trachtenberg | |
| 6,467,283 B1 | 10/2002 | Trachtenberg | |
| 6,609,385 B1 | 8/2003 | Ferris et al. | 62/77 |

* cited by examiner

Primary Examiner—Cheryl Tyler
Assistant Examiner—Filip Zec
(74) Attorney, Agent, or Firm—Levisohn, Berger & Langsam, LLP

(57) ABSTRACT

A portable device for measuring the refrigerant pressure in an automobile air conditioning system and, if needed, charging the system with additional refrigerant, is provided. An actuator is coupled to a pressurized container that selectively opens the container valve. A hose is provided, the first end of which is connected to the actuator, and the second end is coupleable to a service port of an automobile air conditioner. A T-connector with a check valve is disposed in the hose, and a pressure gauge is connected to the T-connector. When the second end of the hose is coupled to a service port and the actuator is not activated, the pressure gauge measures a pressure of the air conditioner. When the second end is coupled to a service port and the actuator is activated, refrigerant is released from the pressurized container and into the air conditioner.

15 Claims, 14 Drawing Sheets

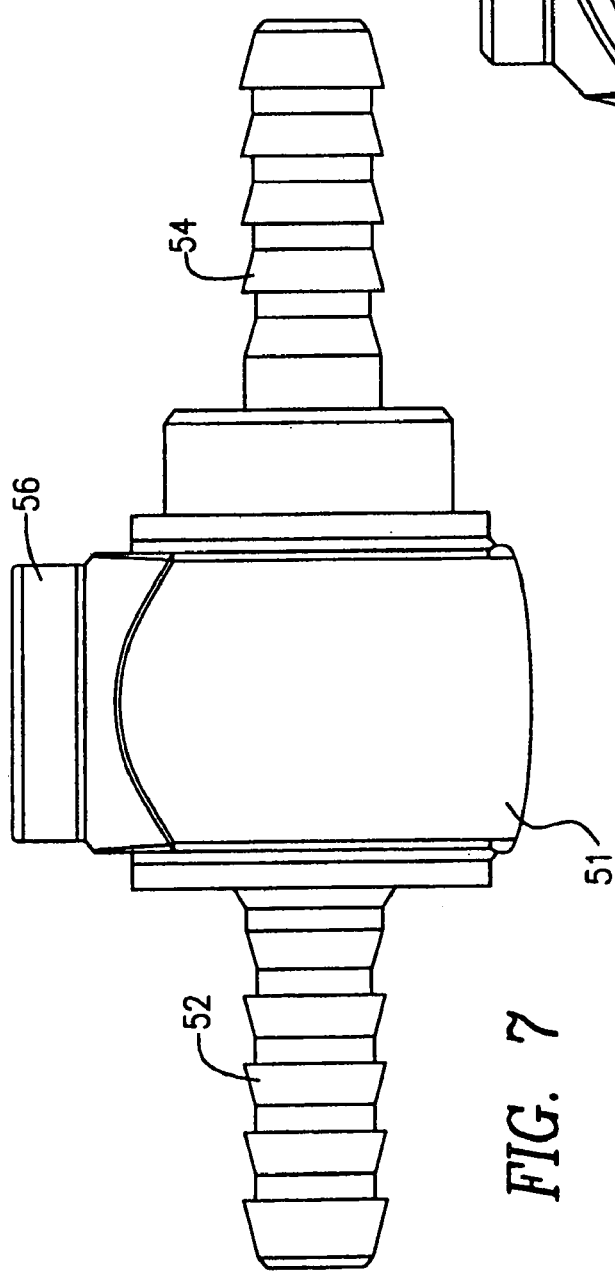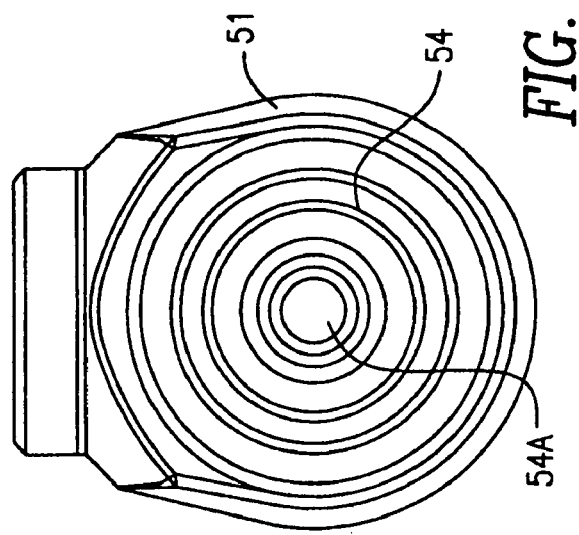

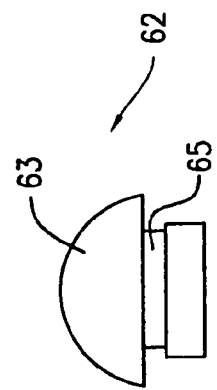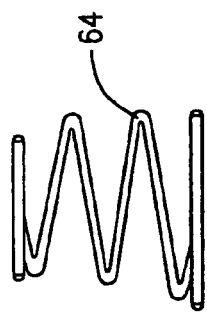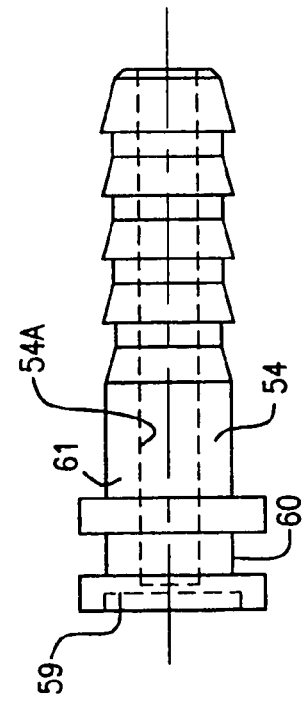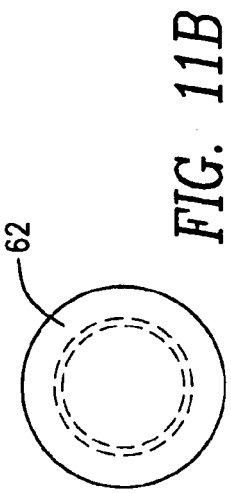
FIG. 11A
FIG. 11B
FIG. 10A
FIG. 10B
FIG. 9

DEVICE FOR MEASURING PRESSURE IN AUTOMOBILE AIR CONDITIONER AND CHARGING SAME WITH REFRIGERANT AND METHOD OF SAME

BACKGROUND OF THE INVENTION

1. Field of the Invention

The invention relates to devices for servicing automotive systems such as automobile air conditioning systems and more specifically to devices allowing the ordinary consumer to measure pressure in automobile air conditioner and charging same with refrigerant.

2. Description of Related Art

Automobile air conditioners, like most air conditioners, use gaseous chemicals called refrigerants to cool air. In accordance with Gay-Lussac's Law, which is $$P/T=P'/T' \text{ where } V \text{ is constant} \qquad (1)$$

and where P=pressure, T=temperature, V=volume, as the pressure of a compressed gas increases, its temperature increases. Similarly, as the pressure of the gas decreases, the temperature of the gas decreases. In this manner, gas is compressed and then expanded, and air is blown over that portion of the system in which the gas is expanded, and thus the blown air is cooled. This is the basic concept of most refrigeration and air conditioning systems.

Since the pressure of the refrigerant plays an integral part of how efficiently an air conditioning system functions (or if it functions at all), it is desirable to be able to check the pressure of the refrigerant in the air conditioning system to insure that sufficient refrigerant is present. If the system pressure is too low, there will not be sufficient gas to compress and then expand, and the resultant change in temperature will be decreased; the air blown over the cooled portion of the system will, in turn, not be cooled sufficiently. Because the system is subject to significant swings in temperature and frequent thermal cycling—owing both to the action of the air conditioner as well as from the heat of the engine—, joints have a tendency to expand and contract, and refrigerant can slowly leak out of a system over time, even without the presence of a serious breach in the integrity of the system. Also, in an air-conditioning system, the hoses are slightly R-134a-permeable, and the refrigerant will slowly leak out of the hose itself. This was not a problem when air conditioners were running on R-12, since R-12 has a larger molecule than R-134a and leaked less frequently. One must keep a vigilant eye on the refrigerant level in one's automobile air conditioner for the air conditioner to function at optimal levels.

Typical automotive air conditioners are provided with at least one service port to allow for the addition of refrigerant and other chemicals as well as to allow a qualified mechanic to check the level of the refrigerant in the system. There are, however, many automobile owners who choose to perform routine maintenance on their vehicles themselves. This market is commonly referred to as the "do-it-yourself" market, for self-evident reasons.

A standard tool for servicing automobile air conditioners is a set of manifold gauges. This device usually includes three hoses and two gauges: one hose connects to the low pressure service port, one hose connects to the high pressure service port, and the third hose connects to the source of refrigerant. The two gauges measure the pressure at the high and low pressure service ports, respectively. One must know the approximate ambient temperature and look up the pressure readings of the gauges on a chart to determine if there is sufficient refrigerant in the system. Manifold gauges are the standard tool for professional auto mechanics, but they are not popular with do-it-yourself consumers, as they are very complicated to use. Moreover, an amateur should not be opening and using the high pressure service port of the auto air conditioner since there is a much greater risk of injury than with the low pressure side.

A number of products have been developed by the assignee of the instant invention that allow the do-it-yourselfer to perform maintenance on an automobile air conditioner safely and easily. Some examples are described in U.S. Pat. No. 6,089,032; U.S. Pat. No. 6,446,453; and U.S. Pat. No. 6,467,283, all to Trachtenberg, the teachings of which are all herein incorporated by reference. These products include methods and kits for changing an air conditioning system over from using R-12 to R134a and a kit for servicing an air conditioning system.

The servicing kit of U.S. Pat. No. 6,446,453 includes a unitary hose connection for servicing an automobile air conditioning system. A first connector is disposed at one end and is connectable with a low pressure service port of an automobile air conditioning system, and a second connector is disposed at the other end of the hose and is selectively connectable with both a pressure gauge and a can tap valve. The can tap valve is attachable to a can of compressed refrigerant. When a pressure gauge is attached to the second connector and the first connector is attached to the service port, the pressure of the refrigerant in the automobile air conditioning system can be measured. When the second connector is attached to the can tap valve, the compressed refrigerant in the can may be introduced into the automobile air conditioning system to thereby service the system. The hose connection, pressure gauge, can tap valve, and can (or cans) of refrigerant may be packaged together in a kit.

While the above-described servicing system is quite useful for servicing an automobile air conditioner, it is still a little cumbersome to use, in that it requires at least two connections to be made in order to measure the pressure of the refrigerant in the air conditioner and add more refrigerant to the air conditioner. Every time the hose is removed from the port, a quantity of the pressurized gas spurts out of the hose, and air can enter the hose when it is disconnected. This enables air—and any impurities in the air—to be introduced into the air conditioner and threatens to lessen the performance of the system. Also, if a user is not careful when using the servicing kit and removes the pressure gauge while the hose is still attached to the service port, the refrigerant and oil will come shooting out of the system via the hose, invariably in the direction of the user. Thus, the servicing kit described is not quite "idiot-proof."

Another drawback to conventional do-it-yourself systems is that it is difficult to know when one has added sufficient refrigerant. With the servicing kit of U.S. Pat. No. 6,446,453, one must repeatedly connect and disconnect the hose alternatively to the gauge and the container in order to check on the progress of the recharging of the system. Also, it is not very convenient to store any refrigerant remaining in the container. One must close the can tap valve completely and keep the valve connected to the can. Failure to close the can tap valve completely will result in the refrigerant leaking out of the container. Even when fully closed, they tend to leak.

Such a can tap valve is present in a recent U.S. Pat. No. 6,609,385 to Ferris et al. A disadvantage of such a system is that in order to close the can tap valve and stop the flow of refrigerant into the air conditioner, one must repeatedly turn the handle or knob of the valve until the valve is fully closed.

This procedure can take several seconds, during which refrigerant continues to leave the container and enter the air conditioning system. In other words, if one wanted to stop adding refrigerant to the system at a given point, one would have to know what that point was in advance. (A similar system was sold by the instant assignee in the 1980s as model no. HA-20, in which a check valve was disposed in the piercing valve.). One cannot switch quickly between measuring the pressure in the system to adding additional refrigerant to the system and back again. It is also difficult to tell if the can tap valve has been fully closed when it is intended to be closed. Should the can tap valve be left partially open, the pressure readings on the gauge will be affected. Should the can tap valve be left partially open and the device be disconnected from the air conditioning system, the device will vent refrigerant into the atmosphere.

There is a need for a device to allow a typical consumer to measure the refrigerant pressure in his automobile air conditioner easily and safely and, if the level is low, to add additional refrigerant and possibly other chemicals such as leak detector, lubricant, etc.

SUMMARY OF THE INVENTION

It is an object of the invention to provide a simple and easy-to-use device for the do-it-yourself mechanic to check the refrigerant level of his automobile air conditioner and add refrigerant and/or other chemicals thereto.

It is another object of the invention to provide a device for measuring and charging the refrigerant level of an automobile air conditioner by making a single connection of a device to the service port of the air conditioner.

It is another object of the invention to provide a device for measuring and charging the refrigerant level of an automobile air conditioner that can switch between measuring and charging easily, rapidly, and safely.

It is another object of the invention to provide a device for measuring and charging the refrigerant level of an automobile air conditioner that can switch between measuring and charging and back at the touch of a button.

It is another object of the invention to provide a device for measuring and charging the refrigerant level of an automobile air conditioner that can be turned around for easy reading of the pressure gauge no matter the configuration of the air conditioner and the neighboring components under the hood.

It is another object of the invention to provide a device for checking the level of a automobile air conditioner which cannot accidentally vent the contents of the air conditioner.

The above and other objects are fulfilled by the invention, which is a device for servicing an automobile air conditioner. The device includes a pressurized container of at least one chemical addable to the air conditioner, the container having a first valve. An actuator is coupled to the first valve that selectively opens the first valve. In the case of an acme threaded container, the first valve may be integral with the actuator rather than the container. A hose is provided having a first end and a second end; the first end of the hose is connected to the actuator, and the second end is coupleable to a service port of an automobile air conditioner, preferably the low pressure service port. A pressure gauge is disposed in-line in the hose between the first end and the second end in communication with the second end. When the second end of the hose is coupled to an automobile air conditioner service port and the actuator is not activated, the pressure gauge measures a pressure of the air conditioner. When the second end is coupled to an automobile air conditioner service port and the actuator is activated, the at least one chemical is released from the pressurized container and into the air conditioner via the hose and the service port.

The pressure gauge is preferably attached to the hose via a novel T-connector in accordance with the invention. The novel T-connector includes an inlet in communication with the first end of the hose, a first outlet in communication with the pressure gauge, and a second outlet in communication with the second end of the hose. The T-connector preferably includes a check valve, biased closed to enable flow in from the second outlet to the first outlet to enable communication between the service port and the gauge. When the actuator is activated, the pressurized chemical released from the container overcomes the bias of the check valve and exits the T-connector via the second outlet. The check valve preferably includes a stopper seatable on a shoulder and a spring biasing the stopper onto the shoulder to close the valve. The check valve is preferably disposed in the hose between the gauge and the container. The check valve is biased closed to enable flow from the service port to the gauge.

The inventive device may be sold as a single integral unit with the first end of the hose permanently connected to the actuator and the actuator permanently connected to the container, or it may be sold as a kit with the first end of the hose being removably connected to the actuator and the actuator being removably connected to the container. The device may include or be sold separately from the pressurized container.

The preferred container is an aerosol can having a valve that includes a valve stem (although an acme can may be employed instead). For such a container, the actuator preferably includes a housing snap-fittable onto a shoulder of the pressurized container, and a button attached to the housing in a cantilever matter. The button includes a fluid flow path in communication with the valve stem and the first end of the hose.

More preferably and specifically, the invention is a portable device for measuring an amount of refrigerant in an automobile air conditioner and adding additional refrigerant thereinto so as to elevate the refrigerant level in the air conditioner to a predetermined level. A pressurized container is provided of at least refrigerant addable to the air conditioner, the container having a first valve. An actuator is coupled to the container valve that selectively opens the container valve. A hose is connected at a first end to the actuator, and the second end is coupleable to a service port of the air conditioner. A pressure gauge is disposed in the hose between the first end and the second end in communication with the second end. When the second end is coupled to an automobile air conditioner service port and the actuator is not activated, the pressure gauge measures a pressure of the refrigerant in the air conditioner. When the second end is coupled to an automobile air conditioner service port and the actuator is activated, refrigerant is released from the pressurized container and into the air conditioner via the hose and the service port.

Although the invention may include an acme threaded can, the container is preferably an aerosol can having a valve that includes a valve stem. The actuator preferably comprises a housing press-fittable onto a shoulder of the pressurized container and a button attached to the housing in a cantilever matter, the button including a fluid flow path in communication with the valve stem and the first end of the hose. A user switches from measuring existing refrigerant in the automobile air conditioner to adding additional refrigerant by depressing the button. The user switches back from adding additional refrigerant to measuring existing refrigerant in the automobile air conditioner by releasing the button. The container, actuator, hose, and pressure gauge are preferably integrally attached.

The invention also includes a novel T-connector junction adapted to charge an automobile air conditioner in an after-market or do-it-yourself environment. The main body has a first passage in communication with and receiving a source of refrigerant, a second passage, and a third passage connectable to an automobile air conditioner service port. At least one of the first and third passages including a stem rotatably disposed in and projecting from the main body. A check valve is disposed in the T-connector at a proximal end of the first passage. The check valve preferably comprises a stopper seatable on a shoulder, and a spring biasing the stopper onto the shoulder to close the valve. The check valve is biased closed to enable flow in from the third passage to the second passage. When fluid is introduced from the first passage at a pressure greater than the biasing pressure of the check valve, the fluid from the first passage passes through the check valve and exits the T-connector via the third passage. A pressure gauge is preferably connected to the second passage, wherein when the check valve is closed, the pressure gauge measures a fluid pressure of the automobile air conditioner via the third passage.

The stem is preferably included in at least the first passage and more preferably in both the first and third passages. When the main body is rotated relative to the stem or stems, the pressure gauge turns with the main body. That is, the main body and pressure gauge can swivel or rotate around the axis of any hose to which it is attached without twisting the hose or hoses.

The invention is preferably used in the following manner. The second end of the hose is attached to a service port of an automobile air conditioner. The pressure gauge is read to determine the level of refrigerant in the air conditioner. If the pressure reading is lower than a predetermined pressure level, the user depresses a button on the actuator to charge the automobile air conditioner with additional refrigerant from the container. The button is released, and the above steps of measuring and charging the air conditioner are repeated as needed until the refrigerant pressure in the automobile air conditioner reaches the predetermined pressure level.

One can readily appreciate that the invention is easy to use. One need only connect the distal end of the hose to the low pressure service port, and the pressure of the system is quickly displayed on the pressure gauge. If the system has sufficient refrigerant, no further action is required. If the system is low on refrigerant, all one need do is activate the actuator, e.g., depress the button on the container. The pressure in the container overcomes the bias of the check valve, and pressurized refrigerant is released into system via the service port. One may easily monitor the progress of how much refrigerant is added to the system by simply removing one's thumb from the actuator periodically; once the actuator is no longer activated, the pressure gauge resumes reading air conditioner refrigerant pressure. Thus, one can check the system pressure, squeeze in some refrigerant, re-check the system pressure, add more refrigerant if necessary, check the system pressure again, etc.

The invention is also safe to remove and store, even with a quantity of refrigerant remaining in the container. When one is finished and the system is fully charged, one need only remove the distal end of the hose from the service port. The valve on the container is normally biased closed, so the user need not remember to close the valve or take any active steps to prevent the refrigerant remaining in the can from escaping. When the container is empty, the device can still be used as an easy-to-use pressure gauge for the low pressure service port of the air conditioner.

BRIEF DESCRIPTION OF THE DRAWINGS

FIG. 7 is a front elevation view of the T-connector of FIG. 4.

FIG. 8 is a side elevation view of the T-connector of FIG. 4.

FIG. 9 is a side elevation view of the stem of the T-connector of FIG. 4.

FIG. 10A is a side elevation view of the coil spring of the T-connector of FIG. 4.

FIG. 10B is a top elevation view of the coil spring of the T-connector of FIG. 4.

FIG. 11A is a side elevation view of the valve seal of the T-connector of FIG. 4.

FIG. 11B is a top elevation view of the valve seal of the T-connector of FIG. 4.

DETAILED DESCRIPTION OF THE PREFERRED EMBODIMENT AND THE DRAWINGS

Description will now be given of the invention with reference to the attached FIGS. 1–15. It should be noted that these figures are exemplary in nature and in no way serve to limit the scope of the invention, which is defined by the claims appearing hereinbelow.

Figure 1:
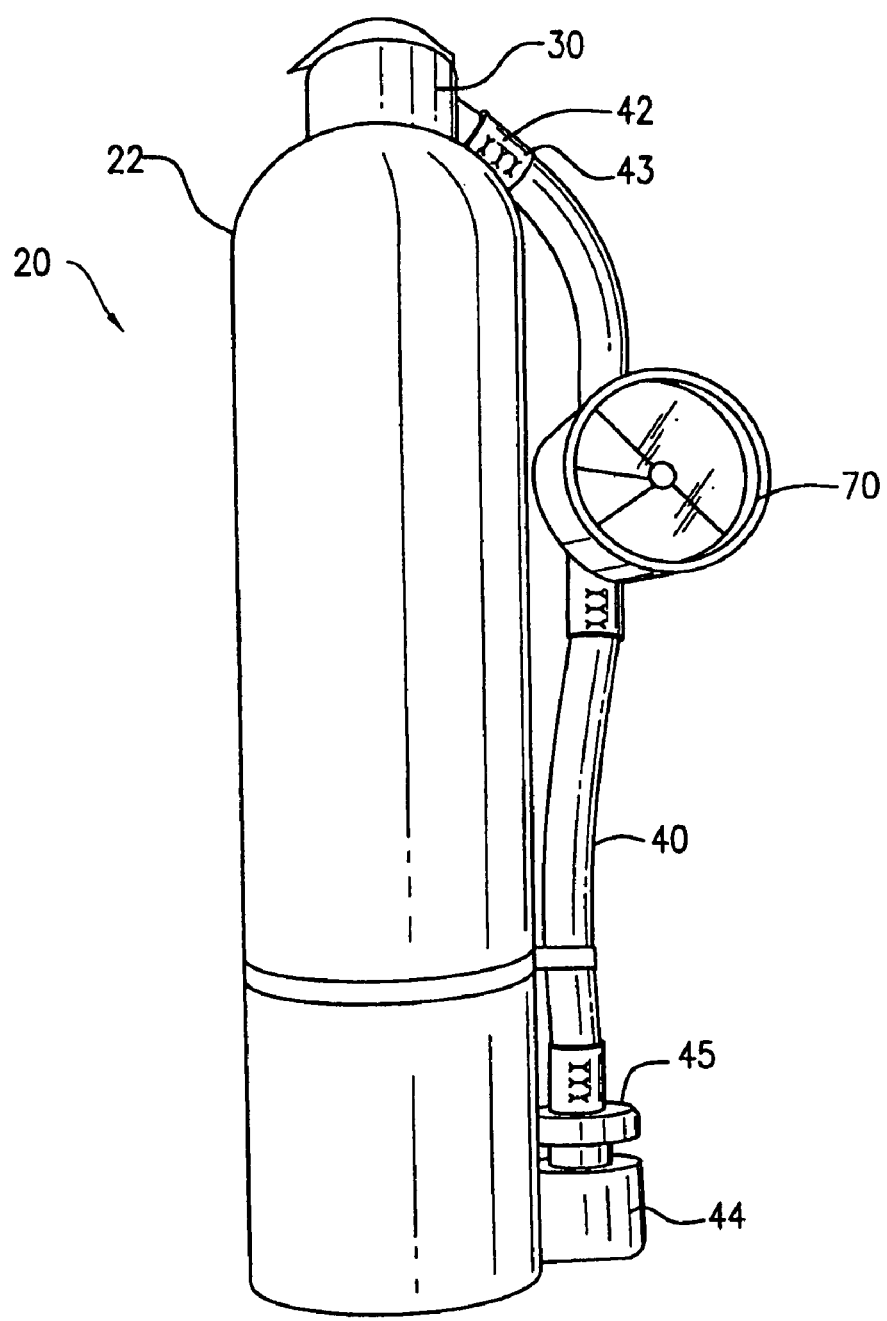
FIG. 1 is a front elevation view of a device in accordance with the invention.
Figure 2:
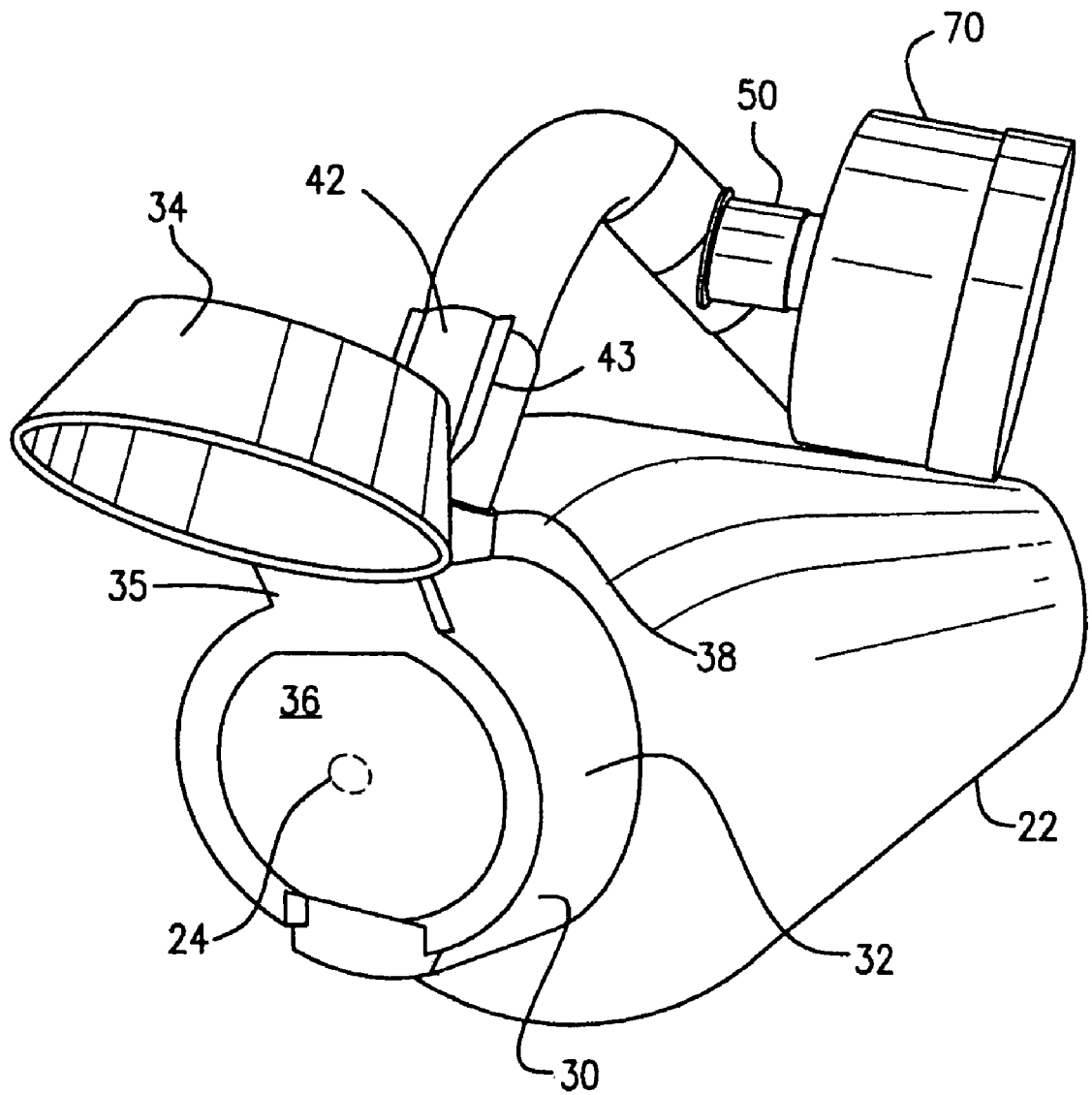
FIG. 2 is a top perspective view of the device in accordance with the invention of FIG. 1.
Figure 3:
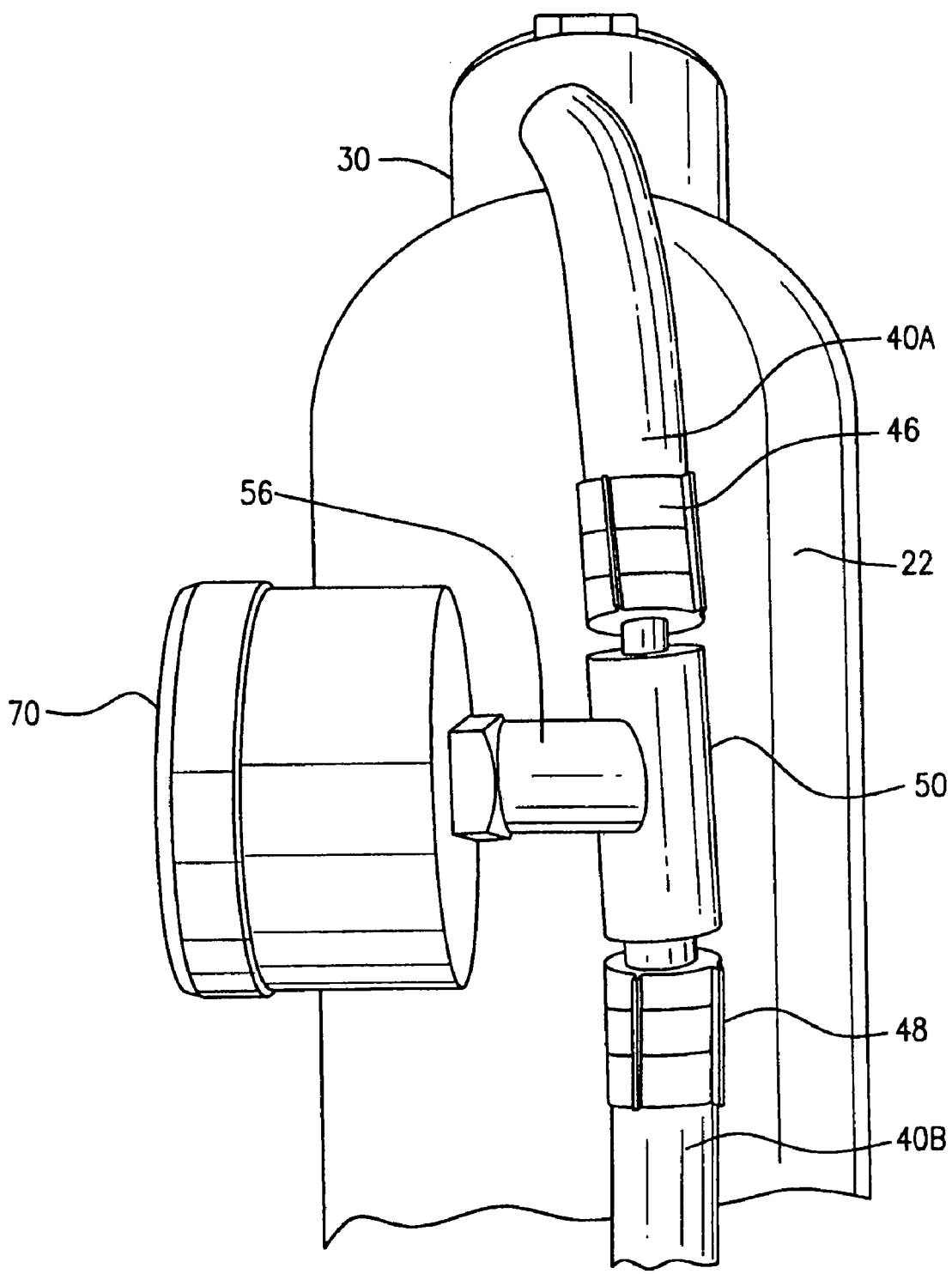
FIG. 3 is an enlarged side elevation view of the device in accordance with the invention of FIG. 1.
Figure 4:
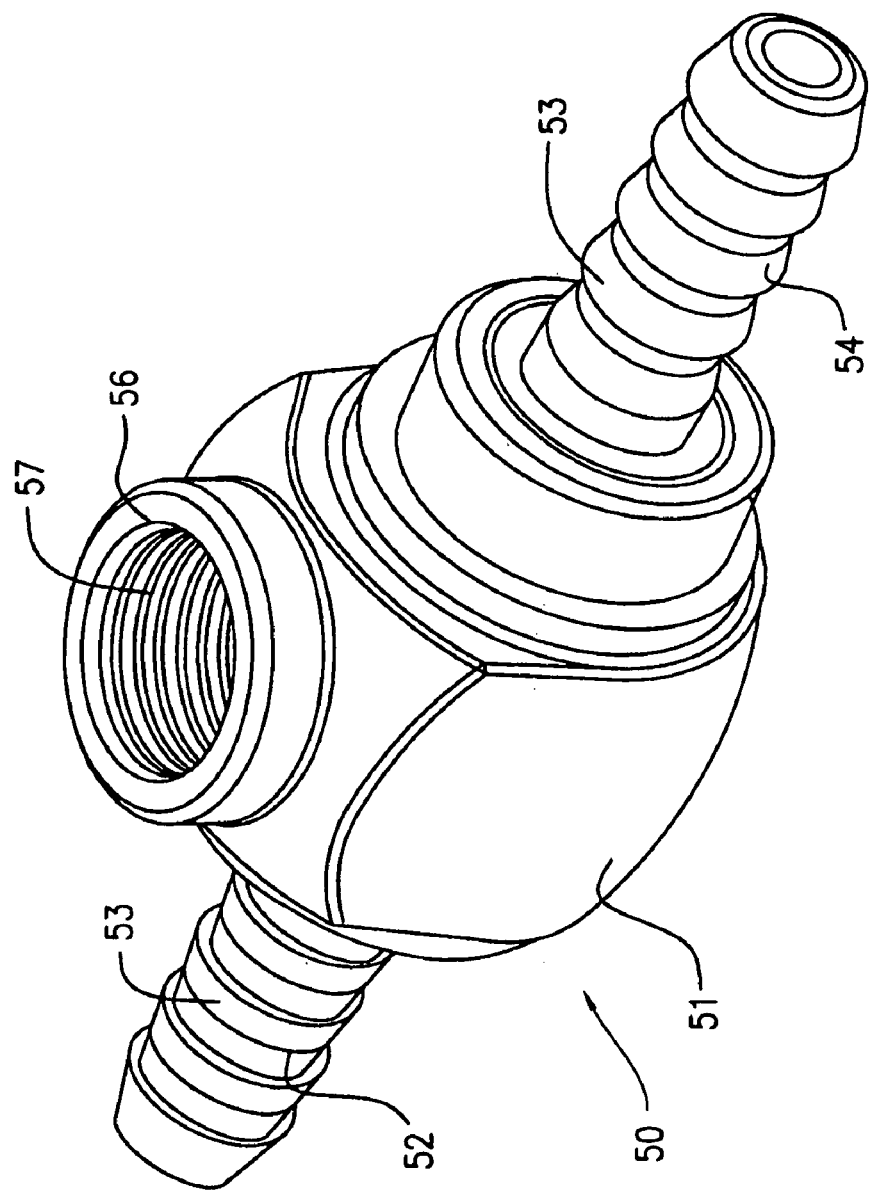
FIG. 4 is a perspective view of a T-connector in accordance with the invention.
Figure 5:
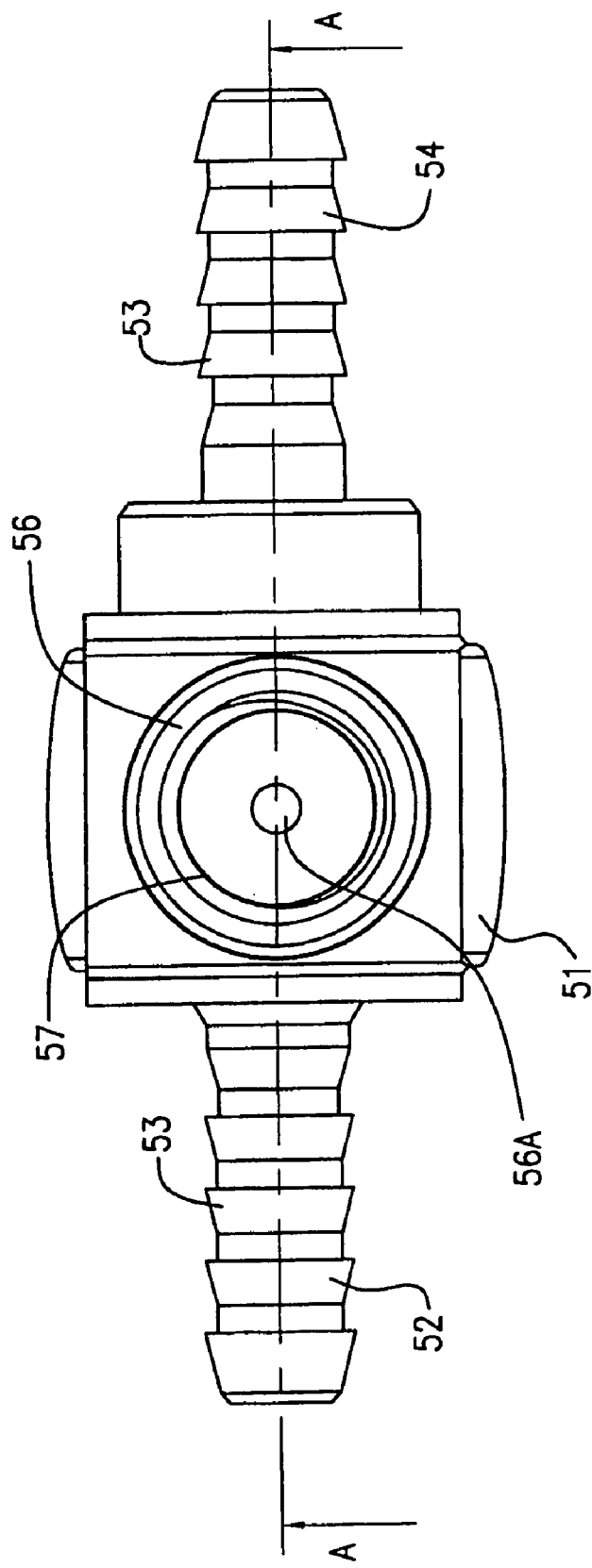
FIG. 5 is a top elevation view of the T-connector of FIG. 4.

As shown generally in FIGS. 1 and 2, the inventive device 20 includes a container or can 22 of pressurized chemicals for use in an automobile air conditioner. Such chemicals preferably include a refrigerant such as R-134a (tetrafluoroethane, or $CH_2FCF_3$), lubricant such as polyol ester lubricant, and optionally a leak sealing agent, a system cleaner, and/or an o-ring conditioner. The preferred type of container 22 is a standard aerosol can having a valve stem 24 (shown in FIG. 2 in shadow).

The contents of pressurized container 22 are released by use of actuator 30. Actuator 30 generally includes a housing 32 which snaps onto the shoulder of container 22 and a cover 34 which prevents inadvertent actuation (explained below). Cover 34 can be a flip-top cover attached to housing 32 via hinge 35, or it could be a removable cover. The flip-top cover shown is preferred so as to prevent the misplacement of the cover. Actuator 30 includes button 36 which sits atop valve stem 24. Button 36 may be attached in a cantilever manner to housing 32, or it may be a separate piece. When button 36 is depressed, it pushes valve stem 24 downward into container 22, thereby opening the container valve and allowing the contents of the container to exit via outlet 38.

Figure 14A:
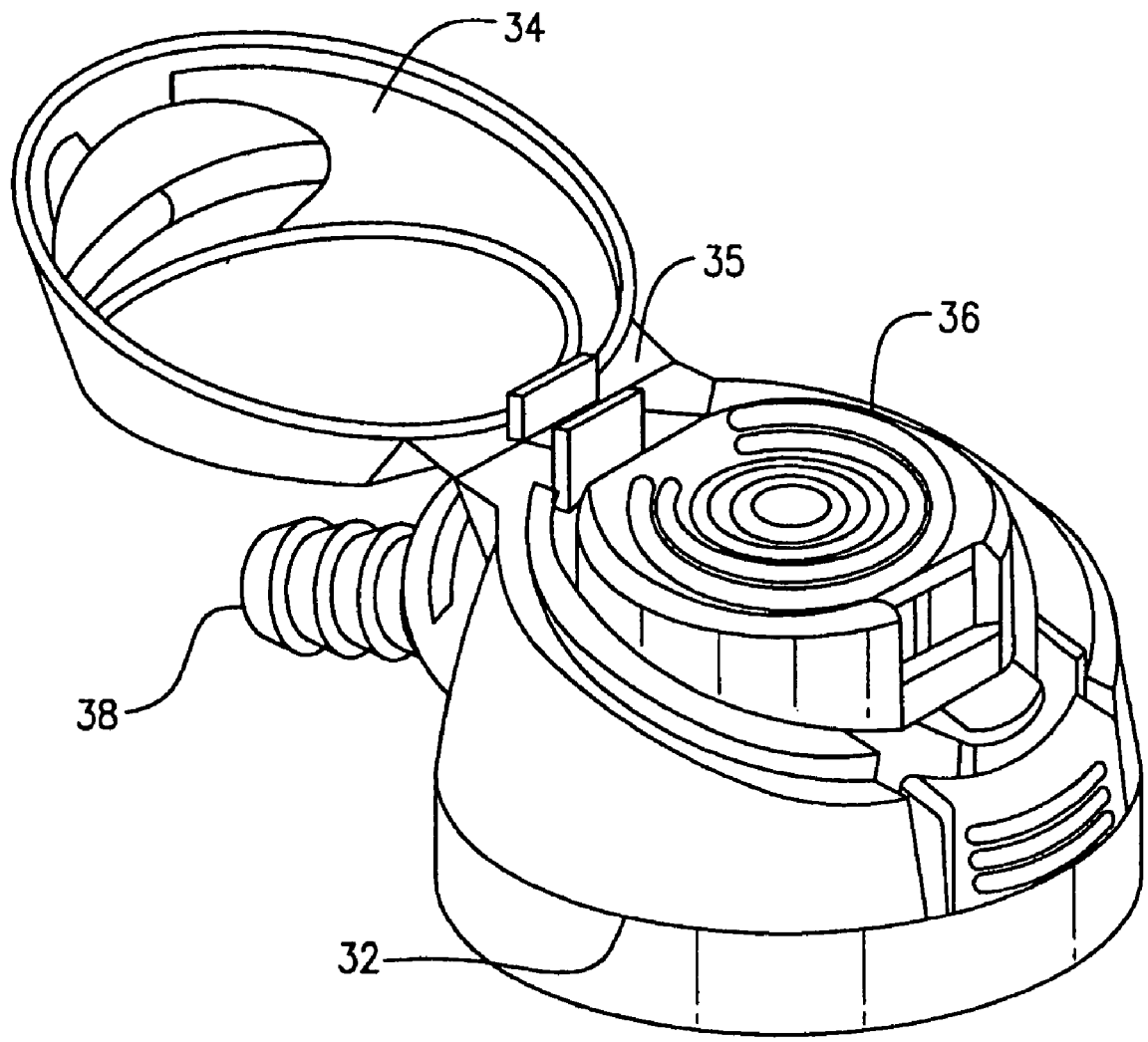
FIG. 14A is a top perspective view of an actuator in accordance with the invention.
Figures 14B, 14C:
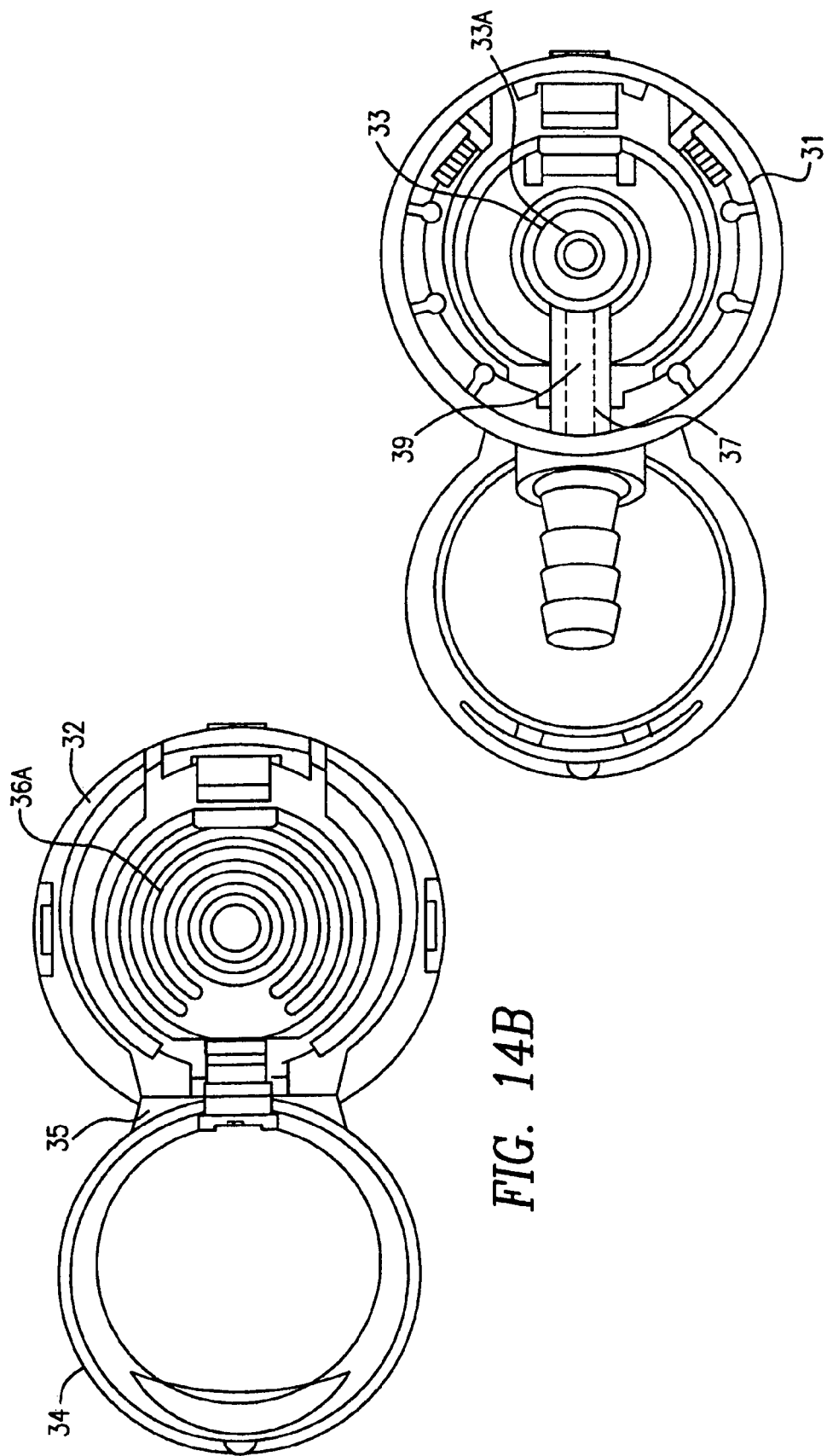
FIG. 14B is a top elevation view of the actuator of FIG. 14A.
FIG. 14C is a bottom elevation view of the actuator of FIG. 14A.
Figure 14D:
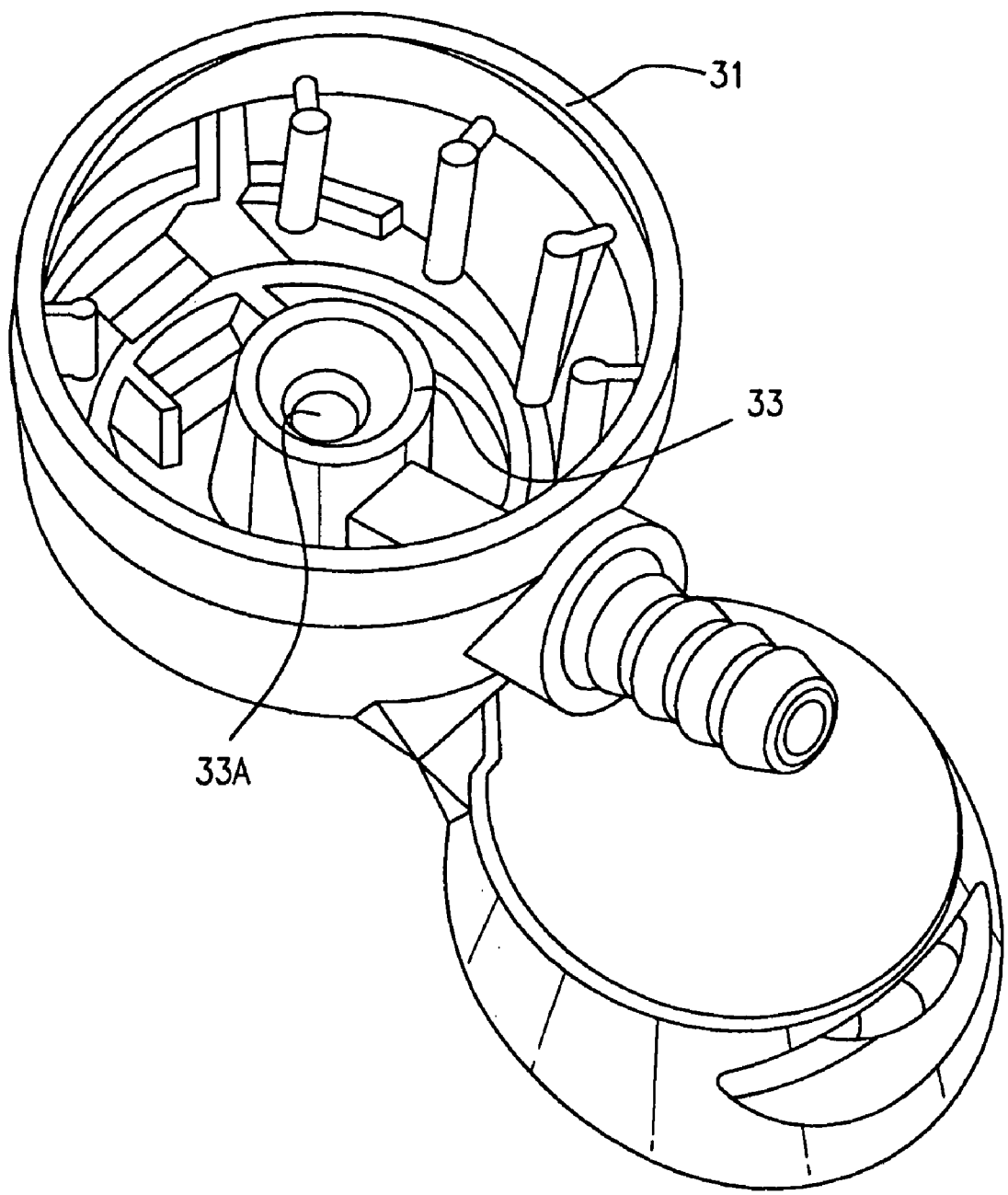
FIG. 14D is a bottom perspective view of the actuator of FIG. 14A.
Figure 14F:
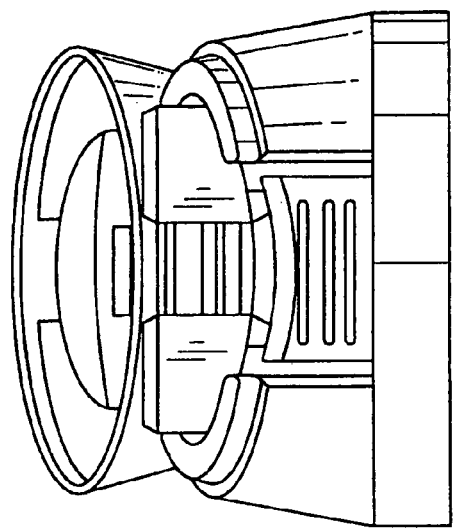
FIG. 14F is a front elevation view of the actuator of FIG. 14A.
Figure 14E:
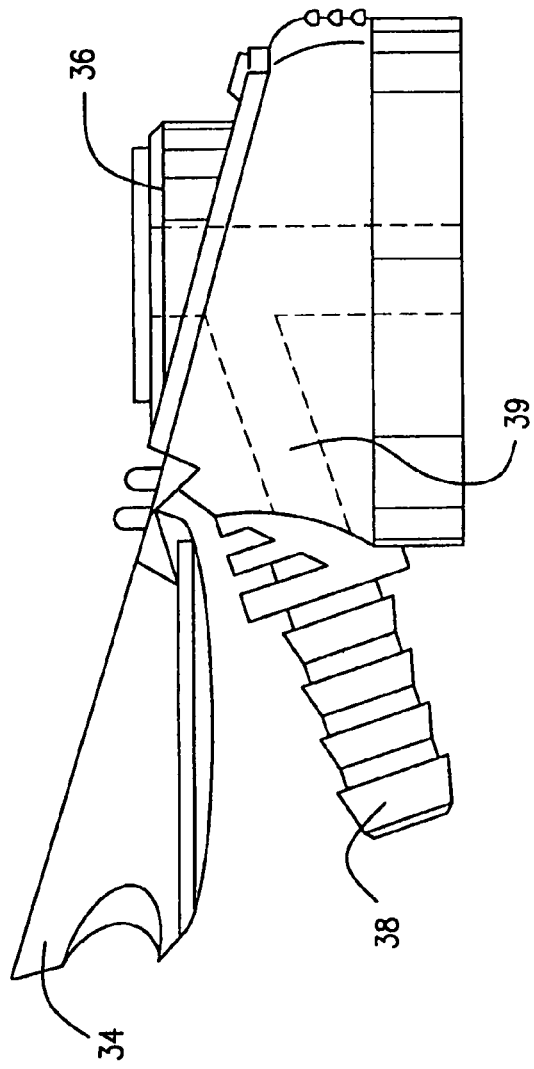
FIG. 14E is a side elevation view of the actuator of FIG. 14A.

A preferred actuator 30 is shown in FIGS. 14A–F. Housing 32 includes a rim or lip 31 which snaps onto the shoulder of a standard aerosol can such as container 22. It is preferred that housing 32 fit extremely tightly on container 22 so it cannot be removed easily. Cover 34 is hingedly attached to housing 32 by hinge 35 and when closed, cover 34 prevents the inadvertent actuation of actuator 30, e.g., when it is not connected to a service port. Button 36 is provided attached to housing 32. In the preferred embodiment, button 36 is attached by bridge piece 37 at one point, so that button 36 is cantilever in nature. As shown in FIGS. 14A and B, the upper side of button 36 is preferably provided with ridges 36A so as to provide increased friction for a person's finger and better ensure that the finger does not slip off of button 36 during use. The underside of button 36 is shown in FIGS. 14C and D. A centrally located hub 33 projects downward from the underside of button 36 and is positioned to engage the valve of container 22. Disposed substantially in the center of hub 33 is cavity 33A which is adapted to receive valve stem 24 of container 22. Cavity 33A is deep enough to receive a portion of valve stem 24 but shallow enough to cause valve stem 24 to bottom out when button 36 is depressed. Cavity 33A is in communication with outlet 38 via fluid flow path 39 formed in bridge piece 37. When button 36 is depressed, hub 33 pushes down on valve stem 24, causing the container valve to open and pressurized refrigerant to emerge from valve stem 24. The refrigerant enters cavity 33A, travels along fluid flow path 39, and exits actuator 30 via outlet 38.

Figure 15:
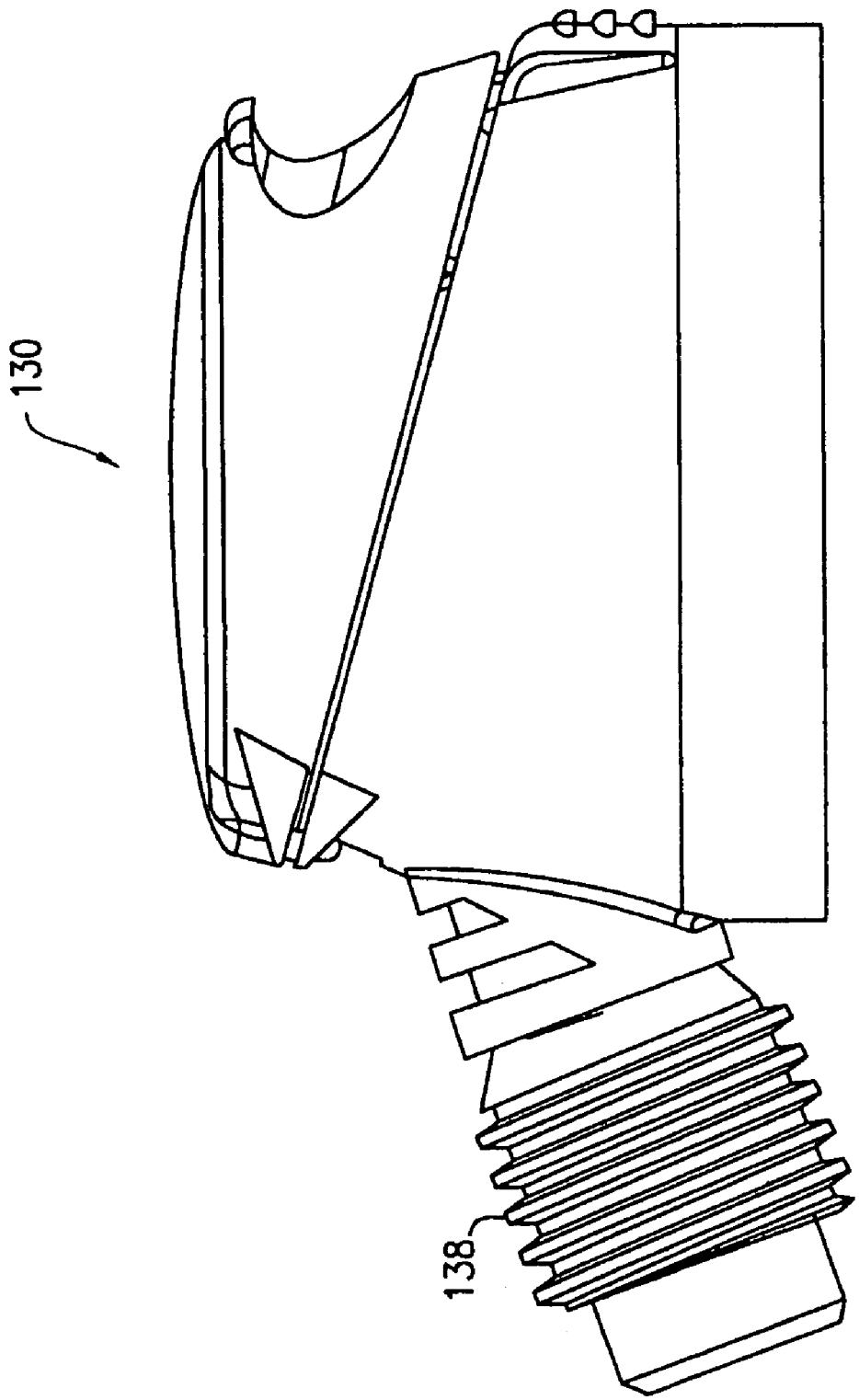
FIG. 15 is a side elevation view of an alternate embodiment of the actuator in accordance with the invention.

An alternate embodiment of the actuator is shown in FIG. 15. Here, actuator 130 is substantially identical to actuator 30 described above, except that actuator 130 includes a threaded nozzle 138. Threaded nozzle 138 enables the actuator to be connected to a threaded hose connection to allow for the replacement of a hose section or the attachment of nozzle 138 to another threaded structure.

Another main component of device 20 is hose 40. A first end 42 of hose 40 is attached to actuator outlet 38; the attachment mechanism is preferably permanent, such as by crimping a metal jacket or ferrule 43 around hose end 42 and outlet 38, but it could be removably connected as well, e.g., by use of a "quick-connect" connector, a threaded piece, etc. The second end 44 of hose 40 terminates in a connector 45 that can be attached securely to a service port of an automobile air conditioner. The connector shown in FIG. 1 is a "quick-connect" type of connector, however any known or to-be-developed connector that can substantially seal to a service port can be used and is contemplated as part of the invention.

Hose 40 preferably has an in-line T-connector 50 (see FIG. 3) which is preferably secured to hose 40 by crimped metal ferrules 46 and 48. More precisely, in the preferred embodiment, a first section of hose 40A is connected to and between outlet 38 and T-connector 50, and a second section of hose 40B is a connected to and between T-connector 50 and connector 45.

T-connector 50 is, in itself, an advance in fluid flow management in the after-market auto air conditioner field. It is shown in great detail in FIGS. 4–13B. T-connector 50 has three branches connected to main body 51: stem 52 is in communication with the air conditioner service port and includes flow path 52A; stem 54 is in communication with container 22 and includes flow path 54A; and branch 56 is in communication with pressure gauge 70 and includes flow path 56A which terminates in threaded cavity 57 (which receives the pressure gauge). Stems 52 and 54 are preferably provided with barbs 53 so that when a hose is placed thereover and a ferrule is crimped onto the outside of the hose, it is difficult to remove the stem from the hose.

Figure 6:
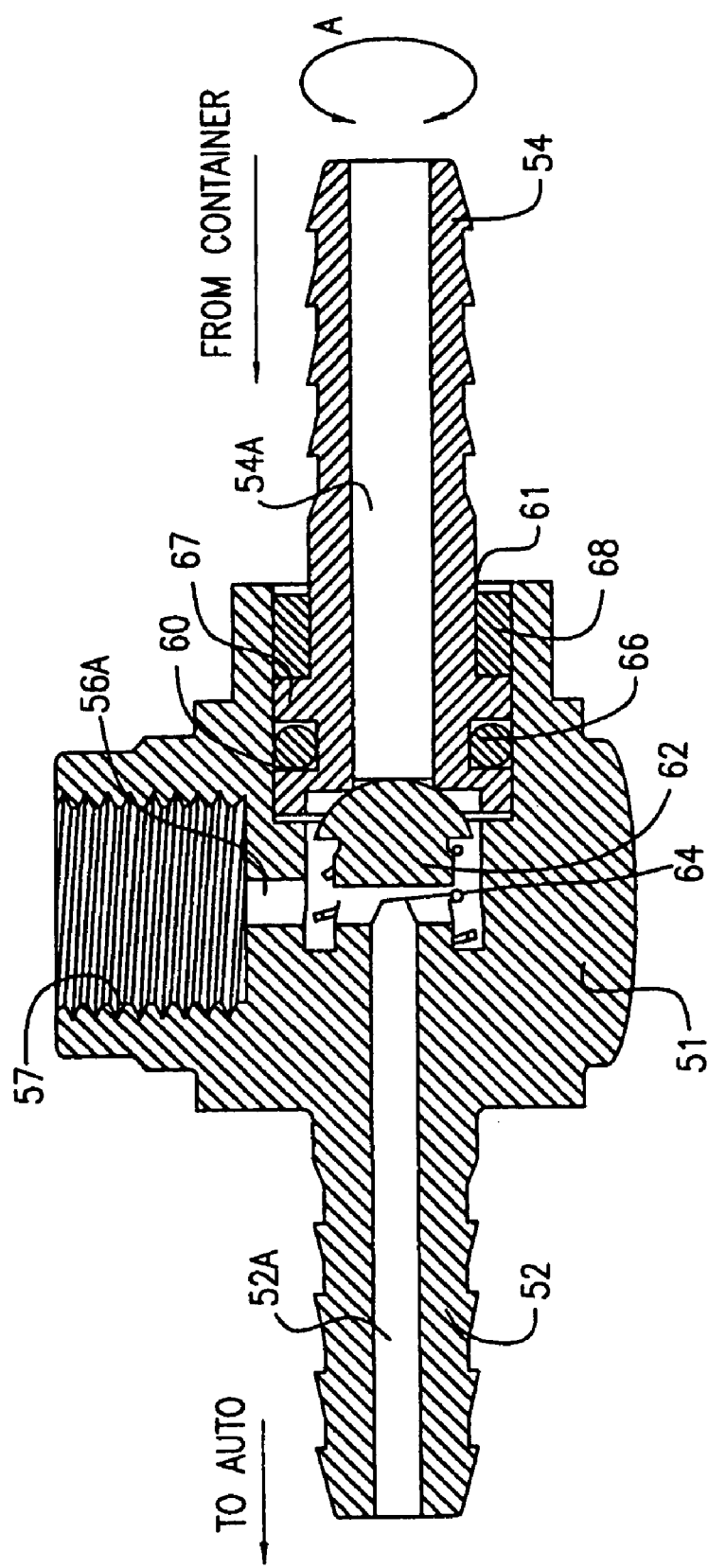
FIG. 6 is a sectional view of the T-connector of FIG. 4 taken along line A—A.

As shown in FIG. 6, in a preferred embodiment, stem 54 is a separate piece from and fit into main body 51 to facilitate construction of T-connector 50 and its internal parts. It is also contemplated and preferred that stem 52 be made as a separate piece from and fit into main body 51. In either case, stems 52 and 54 (or just stem 54) are rotatably fit into main body 51 about the longitudinal axis of the stem, i.e., in the direction of arrow A of FIG. 6. If stem 54 is the only stem rotatably disposed in main body 5 1, then main body 51, pressure gauge 70, and hose section 40B will be rotatable with respect to hose section 40A. If both stems 52 and 54 are rotatably disposed in main body 51, then the T-connector 50 will be rotatable or swivelable independently of either portion of hose 40. The advantage of enabling T-connector 50 to rotate with respect to one or both sections of hose 40 is that gauge 70 will always be viewable by a user, even if connector 45 is attached to the service port in such a way as to face gauge 70 away from the user. All the user need do is swivel T-connector 50 around until gauge 70 is in a convenient to read orientation.

Figure 12B:
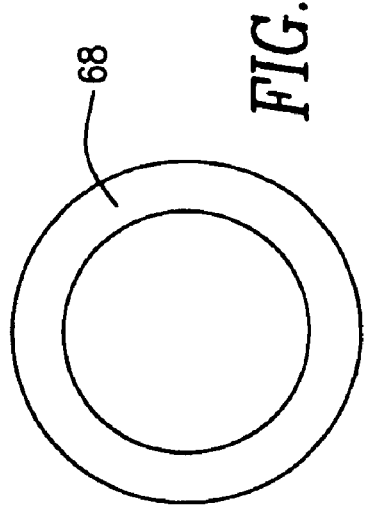
FIG. 12B is a top elevation view of the gasket of the T-connector of FIG. 4.
Figure 12A:
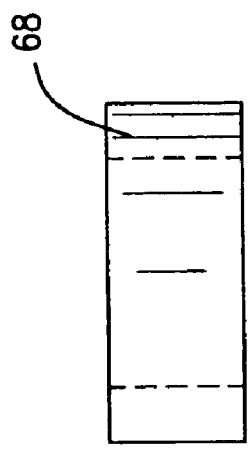
FIG. 12A is a side elevation view of the gasket of the T-connector of FIG. 4.
Figure 13B:
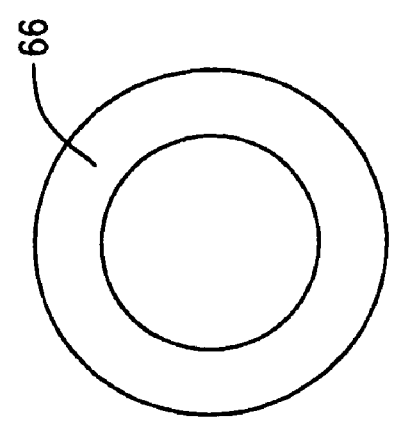
FIG. 13B is a top elevation view of a retaining ring of the T-connector of FIG. 4.
Figure 13A:
FIG. 13A is a side elevation view of a retaining ring of the T-connector of FIG. 4.

Stem 54 includes an internal shoulder 59 (see FIG. 9) upon which stopper 62 sits to close off flow path 54A. The preferred stopper 62 is the mushroom-shaped stopper shown in FIG. 11, however a simple ball could be used instead. The simple ball stopper is more likely to leak owing to the presence of an equatorial flash from the molding process which may prevent a tight seal from forming. The preferred stopper 62 includes a sealing head 63 and a neck 65; head 63 sits against shoulder 59, and spring 64 is attached to neck 65. Spring 64 biases ball stopper 62 against shoulder 59 so as to close off flow path 54A from the rest of the T-connector unless fluid is introduced into stem 54 at a pressure higher than the biasing force of spring 64. Stem 54 also includes notched section 60 and neck portion 61. Seal or gasket 66 is secured to notch section 60; it is shown in FIGS. 6 and 12 as an O-ring, however any type of known sealing means is contemplated as being used (e.g., a flat washer or the like). A rubber retaining ring 68 may be placed around neck portion 61 and press fit into main body 51 so as keep stem 54 in place. Alternatively and preferably, flange 67 can be made much thicker than shown so as to substantially occupy the space otherwise taken up by ring 68, thereby obviating the need for a retaining ring at all. Although this is the preferred check valve, any convenient check valve may be employed.

The preferred material for constructing the inventive T-connector is die-cast zinc. Main body 51 is preferably swaged around stems 52 and 54 (or just stem 54 if stem 52 is integral with main body 51), thereby deforming a lip of material around the stems.

In operation, the invention works as follows. The user attaches connector 44 to the service port of an automobile air conditioner, thus allowing refrigerant from the air conditioner to flow into connector 44, through hose section 40B, enter flow path 52A, and pass into flow path 56A. By doing so, the user is able to read the pressure level from the service port on gauge 70. If the pressure reading is lower than a predetermined level, the user may add refrigerant extremely easily simply by depressing button 36. The force of the pressurized chemicals from container 22 overcomes the biasing force of spring 64 and lifts ball stopper 62 off of shoulder 59. The pressurized chemicals are forced into flow path 52A and out of stem 52, through hose 40B, and into the air conditioner. The user releases button 36, and the pressure gauge 70 provides a reading of the new pressure of the air conditioner. If the level is still too low, the above steps are repeated until the desired level is achieved.

Having described the invention with reference to the drawings, it should be understood that the scope of the invention is not limited by the drawings but rather is defined by the claims appearing hereinbelow. Variations and modifications to the above description that would be obvious to one skilled in the art are contemplated as within the scope of the invention.

What is claimed is:

1. A device for servicing an automobile air conditioner, comprising:
    a pressurized container of at least one chemical addable to the air conditioner, said container having a first valve;
    an actuator coupled to said first valve that selectively opens said first valve;
    a hose having a first end and a second end, said first end connected to said actuator and said second end coupleable to a service port of the air conditioner, said hose further comprising a first section of hose and a second section of hose;
    a T-connector disposed in said hose having an inlet in communication with said first end of said hose, a first outlet, a second outlet in communication with said second end of said hose, and a check valve, said first section of hose being connected between said actuator and said inlet and said second section of hose being connected between said second outlet and a coupler connectable to the automobile air conditioner service port, said T-connector further including a main body from which said inlet and said second outlet project, said inlet including a first stem rotatably disposed in one end of said main body, said second outlet including a second stem rotatably disposed in an opposite end of said main body, said main body and a pressure gauge being rotatable with respect to said hose; and
    said pressure gauge connected to said first outlet of said T-connector and in communication with said second end of said hose,
    wherein when said second end is coupled to an automobile air conditioner service port and said actuator is not activated, said pressure gauge measures a pressure of the air conditioner, and when said second end is coupled to an automobile air conditioner service port and said actuator is activated, said at least one chemical is released from said pressurized container and into the air conditioner via said hose and the service port,
    and wherein said check valve is biased closed to enable flow in from said second outlet to said first outlet to enable communication between the service port and said gauge.
    and wherein when said actuator is activated, said pressurized chemical released from said container overcomes the bias of said check valve and exits said T-connector via said second outlet.

2. A device for servicing an automobile air conditioner according to claim 1, wherein said check valve comprises:
    a stopper seatable on a shoulder; and
    a spring biasing said stopper onto said shoulder to close said valve.

3. A device for servicing an automobile air conditioner according to claim 1, said first end of said hose being permanently connected to said actuator.

4. A device for servicing an automobile air conditioner according to claim 3, said actuator being permanently connected to said container.

5. A device for servicing an automobile air conditioner according to claim 1, said first end of said hose being removably connected to said actuator.

6. A device for servicing an automobile air conditioner according to claim 5, said actuator being removably connected to said container.

7. A device for servicing an automobile air conditioner according to claim 1, wherein said container is an aerosol can and said first valve includes a valve stem.

8. A device for servicing an automobile air conditioner according to claim 7, said actuator comprising:
    a housing press-fittable onto a shoulder of said pressurized container; and
    a button attached to said housing in a cantilever matter, said button including a fluid flow path in communication with said valve stem and said first, end of said hose.

9. A portable device for measuring an amount of refrigerant in an automobile air conditioner and adding additional refrigerant thereto in an after-market environment, comprising:
    a pressurized container of at least refrigerant addable to the air conditioner, said container having a first valve, said container being an aerosol can and said first valve including a valve stem;
    an actuator coupled to said first valve that selectively opens said first valve, said actuator including a housing press-fittable onto a shoulder of said pressurized container and a button attached to said housing in a cantilever manner, said button including a fluid flow path in communication with said valve stem;
    a hose having a first end and a second end, said first end connected to said actuator and said second end coupleable to a service port of the air conditioner, said first end of said hose in communication with said fluid flow path;
    a T-connector disposed in said hose having an inlet in communication with said first end of said hose, a first outlet, a second outlet in communication with said second end of said hose, and a check valve; and
    a pressure gauge connected to said first outlet of said T-connector and in communication with said second end of said hose,
    wherein when said second end is coupled to an automobile air conditioner service port and said actuator is not activated, said pressure gauge measures a pressure of the refrigerant in the air conditioner, and when said second end is coupled to an automobile air conditioner service port and said actuator is activated, refrigerant is released from said pressurized container, overcomes a bias of said check valve, and enters into the air conditioner via said hose and the service port, and wherein a user switches from measuring existing refrigerant in the automobile air conditioner to adding additional refrigerant by depressing said button.

10. A device for measuring an amount of refrigerant in an automobile air conditioner and adding additional refrigerant thereinto according to claim 9, wherein a user switches back from adding additional refrigerant to measuring existing refrigerant in the automobile air conditioner by releasing said button.

11. A device for measuring an amount of refrigerant in an automobile air conditioner and adding additional refrigerant thereinto according to claim 10, wherein all of said container, said actuator, said hose, and said pressure gauge are integrally attached.

12. A T-connector junction adapted to charge an automobile air conditioner in an after-market environment, comprising:

a main body having a first passage in communication with and receiving a source of refrigerant, a second passage, and a third passage connectable to an automobile air conditioner service port, at least one of said first and third passages including a stem rotatably disposed in and projecting from said main body, said at least one stem including a first stem rotatably disposed in and projecting from said main body in said first passage, and a second stem rotatably disposed in and projecting from said main body in said third passage;

a check valve in said T-connector at a proximal end of said first passage; and a pressure gauge connected to said second passage, wherein said check valve is biased closed to enable flow in from, said third passage to said second passage, and wherein when fluid is introduced from said first passage at a pressure greater than the biasing pressure of said check valve, the fluid from said first passage passes through said check valve and exits said T-connector via said third passage, and wherein when said check valve is closed, said pressure gauge measures a fluid pressure of said third passage, and wherein when said main body is rotated relative to said stems, said pressure gauge turns with said main body.

13. A T-connector junction according to claim 12, said stem being included in said first passage, wherein when said main body is rotated relative to said stem, said pressure gauge turns with said main body.

14. A T-connector junction according to claim 12, wherein said check valve comprises:

a stopper seatable on a shoulder; and a spring biasing said stopper onto said shoulder to close said valve.

15. A T-connector junction according to claim 14, further comprising a pressure gauge connected to said second passage, wherein when said check valve is closed, said pressure gauge measures a fluid pressure of said third passage.

* * * * *